(12) United States Patent
Kim et al.

(10) Patent No.: US 11,061,541 B2
(45) Date of Patent: Jul. 13, 2021

(54) APPARATUS, METHOD, AND COMPUTER-READABLE RECORDING MEDIUM FOR COMPACTEDLY DISPLAYING POPUP CONTENT

(71) Applicant: NAVER CORPORATION, Seongnam-si (KR)

(72) Inventors: Hyo Kim, Seongnam-si (KR); Ji Ho Choi, Seongnam-si (KR); Yun Seok Lee, Seongnam-si (KR); Sung Mann Cho, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 364 days.

(21) Appl. No.: 15/174,494

(22) Filed: Jun. 6, 2016

(65) Prior Publication Data

US 2017/0199853 A1 Jul. 13, 2017

(30) Foreign Application Priority Data

Jan. 12, 2016 (KR) .......................... 10-2016-0003667

(51) Int. Cl.
*G06F 3/0484* (2013.01)
*G06T 3/00* (2006.01)
(Continued)

(52) U.S. Cl.
CPC ...... *G06F 3/04842* (2013.01); *G06F 16/9577* (2019.01); *G06F 40/134* (2020.01);
(Continued)

(58) Field of Classification Search
CPC .......... G06F 17/30905; G06F 3/04842; G06F 40/14; G06F 40/134; G06F 40/146;
(Continued)

(56) References Cited

U.S. PATENT DOCUMENTS 7,278,114 B2 * 10/2007 Lapidous .............. G06F 3/0481
715/700
7,334,191 B1 * 2/2008 Sivan ..................... G11B 27/28
715/721

(Continued)

FOREIGN PATENT DOCUMENTS

WO WO 2012/077984 A2 6/2012

OTHER PUBLICATIONS

Notice of Allowance issued in corresponding Korean Patent Application No. 10-2016-0003667, dated Jul. 31, 2017.

*Primary Examiner* — Maikhanh Nguyen
(74) *Attorney, Agent, or Firm* — Greer Burns & Crain Ltd.

(57) ABSTRACT

An apparatus for compactedly displaying popup content includes a processor configured to execute computer program modules; and a non-transitory computer-readable recording medium configured to store executable computer program modules. The non-transitory computer-readable recording medium includes: a determining module configured to determine whether a browsed web page provides popup content through a new window; a popup content analyzing module configured to analyze first popup content when the browsed web page provides the first popup content through the new window; a content editing module configured to generate compressed content based on the result of analyzing the first popup content; and a display controlling module configured to control the compressed content to be displayed on a part of the browsed web page.

15 Claims, 12 Drawing Sheets

(51) Int. Cl.
*G06F 16/957* (2019.01)
*G06F 40/146* (2020.01)
*G06F 40/14* (2020.01)
*G06F 40/20* (2020.01)
*G06F 40/134* (2020.01)
*G06F 40/166* (2020.01)
*G06T 3/40* (2006.01)

(52) U.S. Cl.
CPC ............ *G06F 40/14* (2020.01); *G06F 40/146* (2020.01); *G06F 40/166* (2020.01); *G06F 40/20* (2020.01); *G06T 3/0012* (2013.01); *G06T 3/40* (2013.01); *G06F 2203/04803* (2013.01)

(58) Field of Classification Search
CPC .... G06F 40/20; G06F 40/166; G06F 16/9577; G06F 2203/04803; G06T 3/0012; G06T 3/40
USPC ......................................................... 715/205
See application file for complete search history.

(56) References Cited

U.S. PATENT DOCUMENTS

| | | | | |
|---|---|---|---|---|
| 8,146,013 | B2* | 3/2012 | Bhogal | G06F 16/957 715/808 |
| 8,266,544 | B1* | 9/2012 | Kay | G06F 9/44526 715/808 |
| 8,418,078 | B2* | 4/2013 | Mengerink | G06F 3/0481 715/808 |
| 8,881,055 | B1* | 11/2014 | Kay | G06F 8/61 715/808 |
| 9,148,395 | B2* | 9/2015 | Keohane | H04L 51/16 |
| 9,319,364 | B2* | 4/2016 | Keohane | H04L 51/16 |
| 9,521,435 | B2* | 12/2016 | Selway | H04N 21/2343 |
| 9,729,920 | B2* | 8/2017 | Needham | H04N 21/4104 |
| 9,984,441 | B2* | 5/2018 | Kritt | G06F 3/0486 |
| 10,534,900 | B2* | 1/2020 | Cheong | A61B 5/02055 |
| 10,680,992 | B2* | 6/2020 | Wang | H04L 51/32 |
| 2004/0125149 | A1* | 7/2004 | Lapidous | G06F 3/0481 715/808 |
| 2005/0066290 | A1* | 3/2005 | Chebolu | G06F 3/0481 715/808 |
| 2005/0131945 | A1* | 6/2005 | Muller | G06F 9/451 |
| 2005/0267981 | A1* | 12/2005 | Brumley | H04L 67/02 709/232 |
| 2006/0005148 | A1* | 1/2006 | Cheng | G06F 9/451 715/808 |
| 2006/0250834 | A1* | 11/2006 | Chinn | G06F 3/0482 365/63 |
| 2007/0028185 | A1* | 2/2007 | Bhogal | G06F 16/957 715/808 |
| 2007/0094612 | A1* | 4/2007 | Kraft | H04M 1/72544 715/808 |
| 2007/0234207 | A1* | 10/2007 | Turakhia | G06Q 30/0256 715/234 |
| 2009/0222861 | A1* | 9/2009 | Edmark | G06Q 30/06 725/60 |
| 2012/0311420 | A1* | 12/2012 | Penberthy | G06F 16/951 715/205 |
| 2013/0151634 | A1* | 6/2013 | Selway | H04N 21/633 709/206 |
| 2014/0280640 | A1* | 9/2014 | Keohane | G06F 3/01 709/206 |
| 2014/0282079 | A1* | 9/2014 | Keohane | G06F 3/01 715/752 |
| 2014/0282642 | A1* | 9/2014 | Needham | H04N 21/44218 725/10 |
| 2014/0372943 | A1* | 12/2014 | Kroupa | G06F 3/0482 715/808 |
| 2015/0371363 | A1* | 12/2015 | Kritt | G06F 3/04842 715/800 |
| 2017/0011210 | A1* | 1/2017 | Cheong | G06F 3/017 |

* cited by examiner

APPARATUS, METHOD, AND COMPUTER-READABLE RECORDING MEDIUM FOR COMPACTEDLY DISPLAYING POPUP CONTENT

CROSS-REFERENCE TO RELATED APPLICATION

This application claims the benefit of Korean Patent Application No. 10-2016-0003667, filed on Jan. 12, 2016, in the Korean Intellectual Property Office, the disclosure of which is incorporated herein in its entirety by reference.

BACKGROUND

1. Field

One or more embodiments of the present invention relate to an apparatus, method, and computer program for compactedly displaying popup content, and more particularly, to an apparatus, method, and computer program for compactedly displaying popup content, in which, with respect to providing of popup content together with a web page, the popup content set to be displayed as a separate popup window is edited to be displayed on a part of the web page.

2. Description of the Related Art

A popup window is a window that pops out and is displayed according to a certain event. Several applications provide a popup window interface. Specifically, even recent web browsers provide the popup window interface. The popup window is displayed when a user clicks a certain item or a link or manipulates a keyboard in a certain manner.

When a web browser loads an arbitrary web page and there is a popup window set to be automatically displayed, the popup window connected to the web page is generated and displayed regardless of the intention of a user.

SUMMARY OF THE INVENTION

One or more embodiments of the present invention include an apparatus, method, and computer program for compactedly displaying popup content, in which, with respect to providing of popup content together with a web page, the popup content set to be displayed as a separate popup window is edited to be displayed on the same window as the web page.

One or more embodiments include an apparatus, method, and computer program for compactedly displaying popup content, in which compressed content is generated by summarizing or contracting popup content by considering the popup content.

One or more embodiments include an apparatus, method, and computer program for compactedly displaying popup content, in which popup content is controlled to be intactly displayed by considering the function of the popup content.

Additional aspects will be set forth in part in the description which follows and, in part, will be apparent from the description, or may be learned by practice of the presented embodiments.

According to one or more embodiments, an apparatus for compactedly displaying popup content includes: a processor configured to execute a computer program module; and a non-transitory computer-readable recording medium configured to store an executable computer program module, wherein the non-transitory computer-readable recording medium includes: a determining module configured to determine whether a browsed web page provides popup content through a new window; a popup content analyzing module configured to analyze first popup content when the browsed web page provides the first popup content through the new window; a content editing module configured to generate compressed content based on the first popup content and a result of analyzing the first popup content; and a display controlling module configured to control the compressed content to be displayed on a part of the browsed web page.

When it is determined that the first popup content comprises text based on the result of analyzing by the popup content analyzing module, the content editing module may generate the compressed content by contracting the text to a pre-set threshold number of letters or lower.

When it is determined that the first popup content comprises an image based on the result of analyzing by the popup content analyzing module, the content editing module may extract an object image included in the image and generate the compressed content by adjusting a size of the object image.

When it is determined that the first popup content includes a video based on the result of analyzing by the popup content analyzing module, the content editing module may extract a certain frame of the video as a representative image and generate the compressed content by using only the representative image.

When the browsed web page provides second popup content through a separate window from a window where the first popup content is provided, the popup content analyzing module may further analyze the second popup content, and the content editing module may generate the compressed content based on results of analyzing the first popup content and the second popup content, and on the first popup content and the second popup content.

The content editing module may generate first compressed content based on the result of analyzing the first popup content and the first popup content, and generate second compressed content based on the result of analyzing the second popup content and the second popup content, and the display controlling module may control the first compressed content and the second compressed content to be displayed on a part of the browsed web page, while in independent areas.

When an input of selecting the first compressed content is received, the display controlling module may stop displaying of the first compressed content.

The first compressed content includes link information of the first popup content, the second compressed content may include link information of the second popup content, and when an input of selecting the first compressed content is received, the display controlling module may display a web page corresponding to the link information included in the first compressed content through a new window.

The display controlling module may control the compressed content to be displayed outside an area set to display the browsed web page.

The determining module may analyze whether the first popup content includes an input field when the browsed web page provides the first popup content through the new window, and the display controlling module may control the first popup content to be intactly displayed when it is determined that the first popup content includes the input field.

The content editing module may generate notification content including a number of pieces of popup content provided together with the browsed web page, and the display controlling module may control the notification content to be displayed on a part of the browsed web page instead of the compressed content.

When a certain user input is received, the display controlling module may control the compressed content to be displayed instead of the notification content.

According to one or more embodiments, a method of compactedly displaying popup content includes: determining whether a browsed web page provides popup content through a new window; analyzing first popup content when the browsed web page provides the first popup content through the new window; generating compressed content based on the first popup content and a result of analyzing the first popup content; displaying the compressed content on a part of the browsed web page.

The generating of the compressed content may include, when the first popup content comprises text, generating the compressed content by contracting the text to a pre-set threshold number of letters or lower.

The generating of the compressed content may include, when the first popup content comprises an image, generating the compressed content by extracting an object image included in the image and adjusting a size of the object image.

The generating of the compressed content may include, when the first popup content comprises a video, extracting a first frame of the video as a representative image and generating the compressed content by using only the representative image.

The determining may include, when the browsed web page provides the first popup content through the new window, determining whether the first popup content comprises an input field, and the displaying of the compressed content may include, when the first popup content includes the input field, intactly displaying the first popup contact instead of the compressed content.

The generating of the compressed content may include generating notification content including a number of pieces of popup content provided together with the browsed web page, and the displaying of the compressed content may include displaying the notification content on a part of the browsed web page instead of the compressed content.

When a certain user input is input, the displaying of the compressed content may include displaying the compressed content instead of the notification content.

According to one or more embodiments, a non-transitory computer-readable recording medium has recorded thereon a program, which when executed by a computer, performs the method of compactedly displaying popup content described above.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE INVENTION

Figure 1:
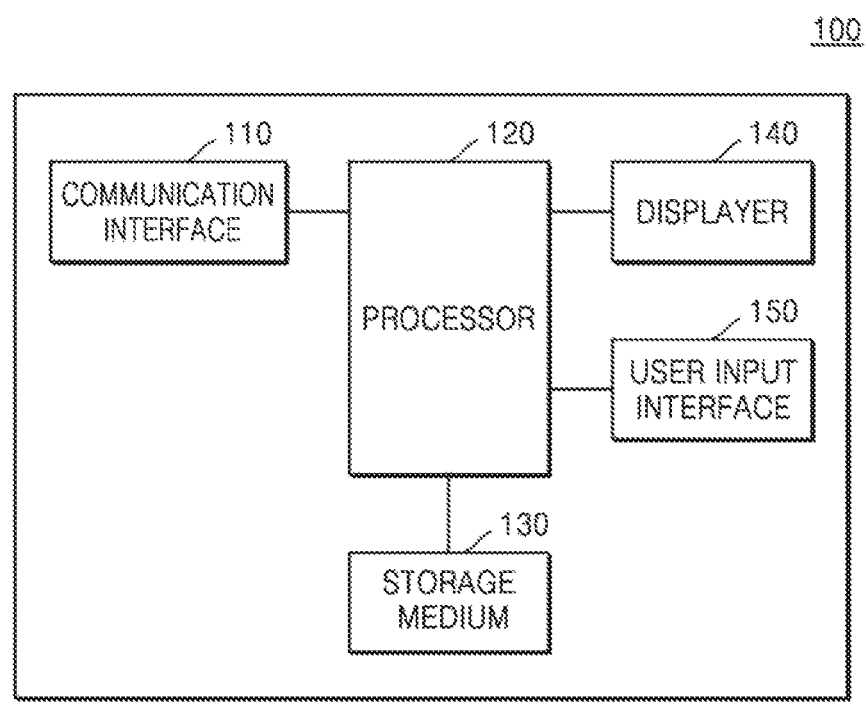
FIG. 1 is a block diagram of an apparatus for compactedly displaying popup content, according to an embodiment.

Reference will now be made in detail to the embodiments of the present invention, examples of which are illustrated in the accompanying drawings. In this regard, the present embodiments may have different forms and should not be construed as being limited to the descriptions set forth herein. Accordingly, the embodiments are merely described below, by referring to the figures, to explain aspects of the present invention.

In the drawings, like reference numerals refer to like elements throughout and overlapping descriptions shall not be repeated.

While such terms as "first", "second", etc., may be used to describe various components, such components must not be limited to the above terms. The above terms are used only to distinguish one component from another.

An expression used in the singular encompasses the expression in the plural, unless it has a clearly different meaning in the context.

In the present specification, it is to be understood that terms such as "including" or "having", etc., are intended to indicate the existence of features or components, and are not intended to preclude the possibility that one or more other features or components may exist or may be added.

When a certain embodiment may be implemented differently, a specific process order may be performed differently from the described order. For example, two consecutively described processes may be performed substantially at the same time or performed in an order opposite to the described order.

As used herein, the term "and/or" includes any and all combinations of one or more of the associated listed items. Expressions such as "at least one of", when preceding a list of elements, modify the entire list of elements and do not modify the individual elements of the list.

The term "circuit", for example, may include at least one of a hardwired circuit storing an instruction executed by a programmable circuit, a programmable circuit, a state machine circuit, and firmware. An application may be realized as a code or instruction executable on a host processor or a programmable circuit. A module used in one or more embodiments may be realized as a circuit. A circuit may be realized as an integrated circuit.

Also, when a part "includes" or "comprises" an element, unless there is a particular description contrary thereto, the part can further include other elements, not excluding the element. In the following description, terms such as "unit" and "module" indicate a unit for processing at least one function or operation, wherein the unit and the block may be embodied as hardware or software or embodied by combining hardware and software.

In the present specification, a popup window is a display window set to be automatically generated when a web page is generated or is closed, and may be generated according to a user input on the web page. The popup window is programmed by a generator of the web page, and functions of the popup window may include at least one of simple transmission of information, reception of certain data, and displaying an advertisement. A point of time when the popup window is generated may be when the web page is generated, when the web page is closed, or when a user input is received on the web page. A plurality of popup windows may be generated in relation to one web page.

For example, a web page of an online store may be configured to generate a popup window including sale information to notify a consumer about the sale information. When the web page is closed according to a user input, the web page may generate a popup window including an advertisement or generate a popup window for downloading a coupon.

FIG. 1 is a block diagram of an apparatus 100 for compactedly displaying popup content, according to an embodiment.

Referring to FIG. 1, the apparatus 100 according to an embodiment includes a communication interface 110, a processor 120, a storage medium 130, a displayer 140 and a user input interface 150.

The apparatus 100 generates and provides a web page in response to a search request or a page generating request of a user. When popup content is provided through a new window together with a web page, the apparatus 100 may control the popup content to be displayed on a part of the web page instead of blocking the content of the web page or displaying the popup content through the new page. Also, the apparatus 100 may analyze the type and the number of pieces of content included in the popup content, and when it is difficult to display the popup content on a part of the web page, may generate compressed content by contracting details of the popup content and display the compressed content on a part of the web page. For example, the apparatus 100 may select all or some of at least one piece of the content included in the popup content based on the result of analyzing the popup content, and generate the compressed content by simplifying the selected content. Here, simplifying of the selected content may include changing the shape or the size of the selected content or removing some of the selected content. Accordingly, the apparatus 100 according to an embodiment may simultaneously display the web page and the popup content while all or some of the web page is not covered by the popup content set to be provided together with the web page.

Also, the apparatus 100 according to an embodiment may generate and display the compressed content obtained by compressing the popup content, thereby providing the popup content through a small area. Also, the apparatus 100 according to an embodiment may generate the compressed content intactly including the details of the popup content, and may display the compressed content including the same details as the popup content on the part of the web page, instead of displaying the popup content through a new window. Accordingly, the apparatus 100 may control first popup content and second popup content, which are included in a first web page and set to be displayed through separate windows, to be displayed on the same window as the first web page while the first web page is not covered by the first popup content and the second popup content. In other words, the user may view not only the first web page, but also the first popup content and the second popup content through a window displaying the first web page.

When the popup content satisfies a certain condition, the apparatus 100 may not generate the compressed content including all or some of the popup content, and may control the popup content to be displayed through a separate window according to a program code and/or a command generating the popup content. For example, the apparatus 100 may receive a code of a web page corresponding to a request of the user from a server (not shown) and analyze the code to determine whether popup content is provided by the web page and whether the popup content includes a user interface, such as an input field. Accordingly, the apparatus 100 may prevent subsequent operations and jobs of the web page from being restricted as the popup content is changed to and displayed as compressed content.

Here, the server has a network address, and transmits a response to a request, the response including the network address or a uniform resource locator (URL), to the apparatus 100. The server is a general computer device, and may include at least one processor and at least one storage medium.

According to an embodiment, the apparatus 100 may display the web page in an area set by the user. Here, the area set by the user may vary according to the resolution, the size, and the number of displayers 140 included in or connected to the apparatus 100. In other words, the apparatus 100 may set all or a part of each displayer 140 or all or some of a plurality of displayers 140 as an area for displaying the web page. The apparatus 100 may generate at least one web page according to a request of the user. The at least one web page may be displayed on all or some of the area set by the user, wherein, if the at least one web page includes two or more web pages, the web pages may overlap each other. Also, the apparatus 100 may generate a new window from a window of a web page currently displayed according to a request of the user, and display the web page or other web page through the new window.

According to an embodiment, the apparatus 100 may further generate an address bar on the displayer 140 into which a network address, a URL, or a keyword is input, and may generate a web page corresponding to the network address, the URL, or the keyword input through the address bar. The apparatus 100 may generate a display area on the displayer 140 including a status bar for displaying a degree of generating, accessing, and progress of a web page, a close button for closing a web page, and a title bar for displaying a title of a web page. The apparatus 100 may receive a code (program code) of a web page according to a request of the user, and analyze the code to generate a web page according to the code. The code of the web page may be realized in any one of various computer programming languages, such as Java script and hypertext mark-up language (HTML). The apparatus 100 may include data for analyzing the code.

The communication interface 110 may be an apparatus including hardware and software required to transmit and receive a signal, such as a control signal or a data signal, to and from another network apparatus via wired/wireless connection.

The processor 120 controls overall operations of the apparatus 100. For example, the processor 120 may control not only control software included in the storage medium 130, but also a receiving module 131, a determining module 132, a popup content analyzing module 133, a content editing module 134, and a display controlling module 135 shown in FIG. 2.

The processor 120 may be a data processing apparatus included in hardware, the data processing apparatus including, for example, a physically structured circuit to perform a function expressed in a code or instructions included in a program. Examples of the data processing apparatus include a microprocessor, a central processing unit (CPU), a processor core, a multiprocessor, an application-specific integrated circuit (ASIC), and a field programmable gate array (FPGA), but are not limited thereto.

The storage medium 130 is a storage apparatus included in the apparatus 100 or electrically connected to the apparatus 100. The storage medium 130 may store a plurality of modules for operating the apparatus 100.

The storage medium 130 may include at least one type of storage media from among a flash memory type memory, a hard disk type memory, a multimedia card micro type memory, a card type memory (for example, a secure digital (SD) card or an extreme digital (XD) card), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. Also, the apparatus 100 may operate a web storage or cloud server performing a storage function of the storage medium 130 on the Internet.

The displayer 140 is provided for displaying image data, and the user input interface 150 is provided for inputting data and requests from the user. The displayer 140 may include at least one of a liquid crystal display (LCD), a thin film transistor-liquid crystal display (TFT-LCD), an organic light-emitting diode (OLED), a flexible display, a 3-dimentional (3D) display, and an electrophoretic display. Also, according to an embodiment, the apparatus 100 may include at least two of the displayers 140. Here, the at least two displayers 140 may be disposed to face each other by using a hinge.

The user input interface 150 is used to receive a request from the user, and may include a keypad, a dome switch, a touch pad (a contact capacitance type, a pressure resistance film type, an infrared detection type, a surface ultrasonic conducting type, an integral tension measuring type, or a piezo-effect type), a jog wheel, or a jog switch, but is not limited thereto.

Figure 2:
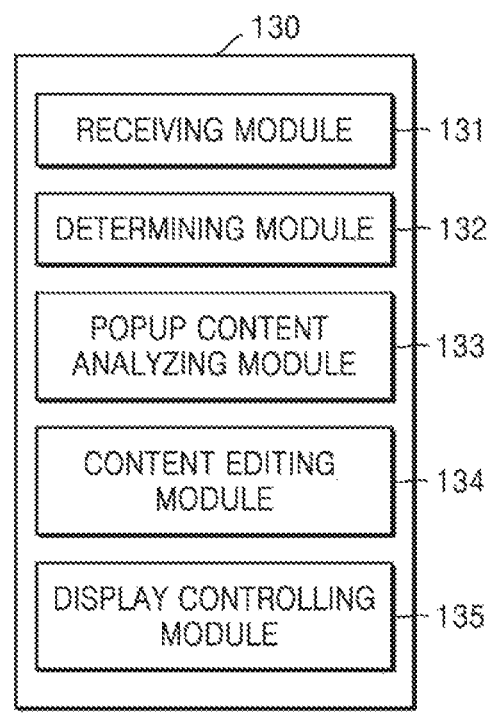
FIG. 2 is a block diagram of a storage medium.

FIG. 2 is a block diagram of the storage medium 130.

Referring to FIG. 2, the storage medium 130 includes the receiving module 131, the determining module 132, the popup content analyzing module 133, the content editing module 134, and the display controlling module 135.

The receiving module 131 receives a code realized to generate a web page corresponding to a request input by the user from a server (not shown). The code is realized in a programming language for generating a web page, and may be realized to display a web page corresponding to a network address, a URL, or a keyword to additionally display at least one piece of popup content. Also, the code may include a code programmed to display popup content for inputting information, such as an agreement to open personal information, popup content displaying an advertisement, or popup content displaying information related to the web page.

The web page is generally displayed within a display area of the displayer 140 set by the user according to the code received by the receiving module 131, and may be displayed through a window occupying all or some of the display area. Here, the window is an area displaying one web page, and the display area is an area displaying at least one window. In the present specification, the popup content is content set to be displayed through a window (hereinafter, referred to as a popup window) separate from the web page.

The determining module 132 determines whether the web page provides the popup content through a new window. For example, the determining module 132 analyzes the code to determine whether the web page provides the popup content through a new window. The determining module 132 determines whether the code includes a function of opening a new window to determine whether the web page provides the popup content through the new window.

When the determining module 132 determines that the web page is provided together with the popup content, the popup content analyzing module 133 may analyze the popup content. The popup content analyzing module 133 analyzes the code received to display the web page to determine the type, the number, and/or the function of content included in the popup content. When the web page is realized in Java script, the popup content analyzing module 133 may determine whether a function related to generating of a window, such as "window.open( )" or "onload", is included in the code, and the number of functions.

Also, the popup content analyzing module 133 analyzes the content to determine whether to provide the popup content intactly or to provide the compressed content. For example, the popup content analyzing module 133 may extract a popup content-related code from the code received by the receiving module 131, and analyze the popup content-related code to determine whether to provide the compressed content. For example, the popup content analyzing module 133 may analyze the popup content-related code to determine a user interface included in the popup content. In other words, the popup content analyzing module 133 may determine to provide the popup content intactly when the popup content includes a field for receiving text, a field for receiving a selection, or the like. Also, the popup content analyzing module 133 may analyze the code to determine whether data input through the popup content is transmitted to the web page, and when the data input through the popup content is transmitted to the web page, displays the popup content intactly without editing. Accordingly, the apparatus 100 according to an embodiment may generate the compressed content from the popup content performing a simple notification, advertisement, or information transmission function and display the compressed content instead of the popup content, or may provide the popup content intactly, without compressing the popup content, when the popup content performs a login function or an agreement input function related to opening of personal information.

The content editing module 134 generates the compressed content based on the result of analyzing performed by the popup content analyzing module 133 and the popup content. Here, the compressed content may be generated to include all or some of the popup content such that the user implicatively knows details of the popup content, and the details of the popup content may be edited. The compressed content may be generated to include at least one piece of popup content. The compressed content may be generated according to a preset size. The size of the compressed content may be determined while considering a size of the displayer 140, a location of content included in the web page, and an area (location and size) where the web page is displayed.

For example, the content editing module 134 may generate the compressed content by reducing the size of the popup content. The content editing module 134 may generate the compressed content to be displayed in a small area by reducing sizes of the font, the image, and the video of the popup content.

Also, for example, the content editing module 134 may generate the compressed content by removing some of the popup content. The content editing module 134 may generate the compressed content including all or some of at least one piece of popup content provided together with at least one web page. For example, when the popup content includes a plurality of images, the content editing module 134 may generate the compressed content by removing some of the images or by including only one of the images. The apparatus 100 according to an embodiment may display the popup content that is provided on a separate window from the web page on the same window as the web page, and may provide popup content provided through a plurality of windows as one piece of compressed content.

For example, when the popup content includes text, the content editing module 134 may generate the compressed content by contracting the text into a pre-set threshold number of letters or lower to display the popup content in a small area. For example, when the popup content includes text, the content editing module 134 may generate the compressed content by removing a postposition, a numeral, an adverb, a determiner, an adjective, and an interjection and leaving a noun and a verb, which have a main meaning from the text. Also, the content editing module 134 may generate the compressed content to include only a certain number of letters from the first syllable of the text. Also, the content editing module 134 may change the font of the popup content to a pre-set font. The content editing module 134 may determine the size of the font of the popup content by considering the size of the compressed content.

For example, when the popup content includes an image, the content editing module 134 may extract a background image or an object image included in the image and generate the compressed content by adjusting the size of the object image. The content editing module 134 may enlarge or reduce the size of the object image according to the size of the compressed content. Also, in order to prevent visibility of the popup content from deteriorating by reducing the size of the popup content, the content editing module 134 may not simply enlarge or reduce the size of the popup content but may extract the background image or the object image from the popup content and generate the compressed content by enlarging or reducing the size of the object image that is more likely to include information to be transmitted to the user than the background image. Here, the object image that is more likely to include the information to be transmitted may be an object image including text.

For example, when the popup content includes a video, the content editing module 134 may extract the first frame of the video as a representative image, and generate the compressed content including only the representative image. The content editing module 134 may edit the representative image according to one of the image editing processes described above, and generate the compressed content including the edited representative image.

For example, when the popup content includes a plurality of images, the content editing module 134 may determine a representative image from the plurality of images considering locations and sizes of the images. Here, the representative image may be a largest image, an uppermost image, or a leftmost image. The content editing module 134 may generate the compressed content including the representative image. The content editing module 134 may edit the representative image according to one of the image editing processes described above, and generate the compressed content including the edited representative image.

When the web page provides a plurality of pieces of popup content, the apparatus 100 according to an embodiment may analyze all of the pieces of popup content, and generate one piece of compressed content based on the pieces of popup content and results of analyzing the pieces of popup content, or generate a plurality of pieces of compressed content corresponding to the plurality of pieces of popup content, based on the pieces of popup content and the results of analyzing the pieces of popup content. When first popup content and second popup content are provided by the web page, the apparatus 100 may analyze a correlation between the first popup content and the second popup content, and when the first popup content and the second popup content are related to each other, generate the compressed content such that the same type of content from among a plurality of pieces of content included in the first popup content and the second popup content is displayed in the same area. When pieces of popup content include the same text or image, it is determined that the pieces of popup content have a correlation.

For example, when a first web page and a second web page respectively provide first popup content and second popup content, the apparatus 100 according to an embodiment may generate first compressed content based on the first popup content and a result of analyzing the first popup content, generate second compressed content based on the second popup content and a result of analyzing the second popup content, and control the first compressed content and the second compressed content to be individually displayed on parts of a web page. The first compressed content and the second compressed content may be displayed through one window or separate windows. The first compressed content and the second compressed content may be individually processed according to an input of select, close, resize, or location change of the user through the separate windows. When the first compressed content and the second compressed content are displayed through one window, the first compressed content and the second compressed content may be processed individually or together with respect to an input of select, close, resize, or location change of the user.

According to an embodiment, the content editing module 134 may determine the size of the compressed content such that the compressed content is displayable on a part of the web page, and then generate the compressed content according to the determined size. Generally, in order to display the popup content in a small area, the determined size of the compressed content may be smaller than the size of the popup content. Also, the content editing module 134 may determine the size of the compressed content such that the compressed content is displayable on an empty space excluding a display area of content included in the web page. Accordingly, the apparatus 100 according to an embodiment may prevent the web page from being covered by the popup content realized to be displayed through a popup window when the web page is generated, and prevent the user from performing an additional input to view the web page. Here, the location and size of the compressed content may be adjusted according to a user input. For example, the location of the compressed content may be moved via drag-and-drop of the user, and the size of the compressed content may be reduced or enlarged according to a user input.

According to an embodiment, the popup content analyzing module 133 may determine the size of the compressed content such that the compressed content is displayed outside the web page. The size of the compressed content may be determined to be smaller than the display area of the web page, and may be determined in consideration of a number of pieces of popup content to be provided, the size and the resolution of the displayer 140, and the size set by the user. In the above description, the size of the compressed content is smaller than that of the popup content, but the size of the compressed content may be larger than that of the popup content.

The display controlling module 135 may control the compressed content to be displayed on the same window as the web page. In other words, the display controlling module 135 may control the compressed content to be displayed on a part of the web page. The display controlling module 135 may determine the location of the compressed content by considering the location of the content included in the web page. The display controlling module 135 may determine the location of the compressed content such that the compressed content does not overlap with the content included in the web page. The display controlling module 135 may generate a code realized to display the compressed content on a location on the web page. The code is realized in a programming language for generating a web page. The display controlling module 135 may control the compressed content to be stopped from being displayed according to a selection input of the compressed content. When an input of clicking or touching a certain area is received, the display controlling module 135 controls the compressed content to be no longer displayed. Here, the certain area denotes an area included in the compressed content. When the web page is no longer displayed, the display controlling module 135 may also stop displaying the compressed content or the popup content provided together with the web page.

FIGS. 3 through 6 are flowcharts of methods of compactedly displaying popup content, according to embodiments.

Figure 3:
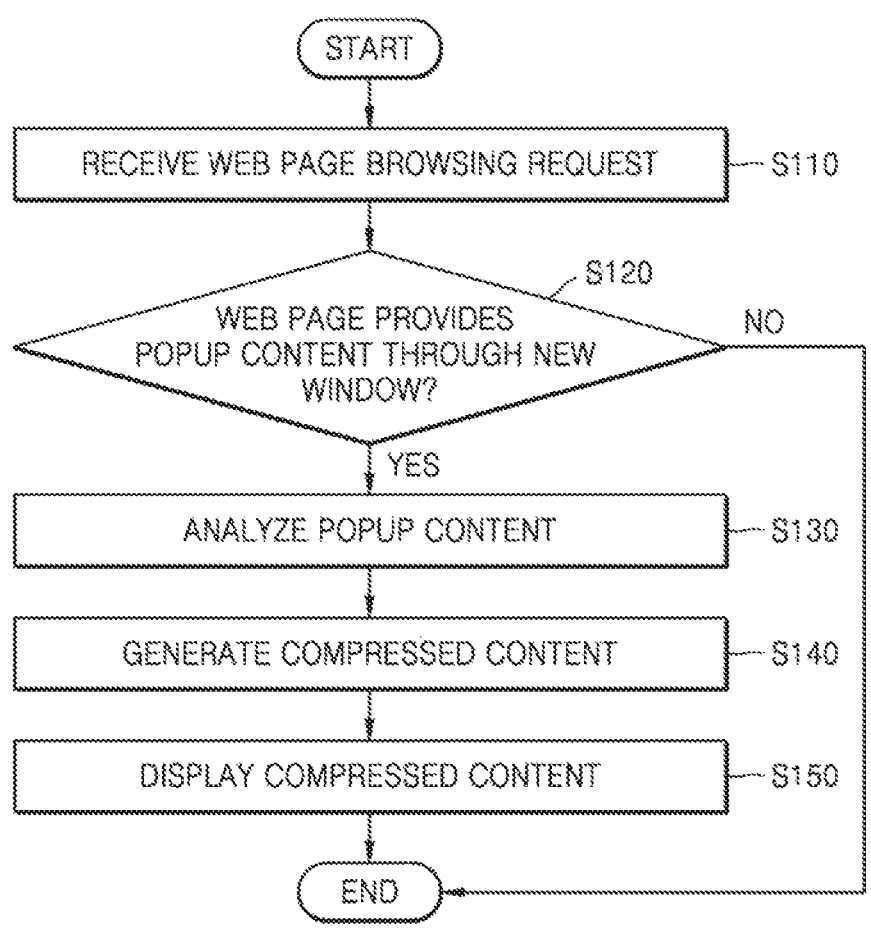
FIGS. 3 through 6 are flowcharts of methods of compactedly displaying popup content, according to embodiments.

Referring to FIG. 3, the method according to an embodiment includes receiving a web page browsing request (operation S110), determining whether a web page provides popup content (operation S120), analyzing the popup content (operation S130), generating compressed content (operation S140), and displaying the compressed content (operation S150).

In operation S110, the user input interface 150 receives a web page browsing request from the user. The user input interface 150 receives an address of a web page to be browsed. The receiving module 131 receives, from a server, a code and/or instructions realized to generate a web page according to a request from the user.

In operation S120, the determining module 132 determines whether the web page provides popup content through a new window. The determining module 132 analyzes the received code and/or instructions to determine whether the web page provides the popup content through the new window.

When it is determined that the web page provides the popup content, the popup content analyzing module 133 analyzes the popup content in operation S130. The popup content analyzing module 133 extracts a code or instructions related to the popup content from among the code or instructions realized to generate the web page, and analyzes the code or instructions related to the popup content to obtain a type and/or number of pieces of the popup content or extract at least one user interface included in the popup content.

In operation S140, the content editing module 134 generates compressed content by summarizing or contracting the popup content in consideration of the result of analyzing the popup content. When the popup content includes text, the content editing module 134 may generate the compressed content by contracting the text to a pre-set threshold number of letters or lower such that the popup content is displayed in a small area. Also, the content editing module 134 may change the font of the popup content to a pre-set font. The content editing module 134 may determine the size of the font of the popup content in consideration of the changed size of the popup content. When the popup content includes an image, the content editing module 134 may extract a background image or an object image included in the image, and generate the compressed content by adjusting the size of the object image. When the popup content includes a video, the content editing module 134 may extract the first frame of the video as a representative image, or when the popup content includes a plurality of videos, the content editing module 134 may extract one of the images as a representative image in consideration of locations or sizes of the images. The content editing module 134 may generate the compressed content including only the representative image. The content editing module 134 may generate the compressed content including all or some of at least one piece of popup content provided together with at least one web page. In operation S150, the display controlling module 135 may control the compressed content to be displayed in a certain area. Here, the certain area may be a part of the web page or the display area that does not overlap with the web page. The certain area may be an area smaller than a window set to provide the popup content.

Figure 4:
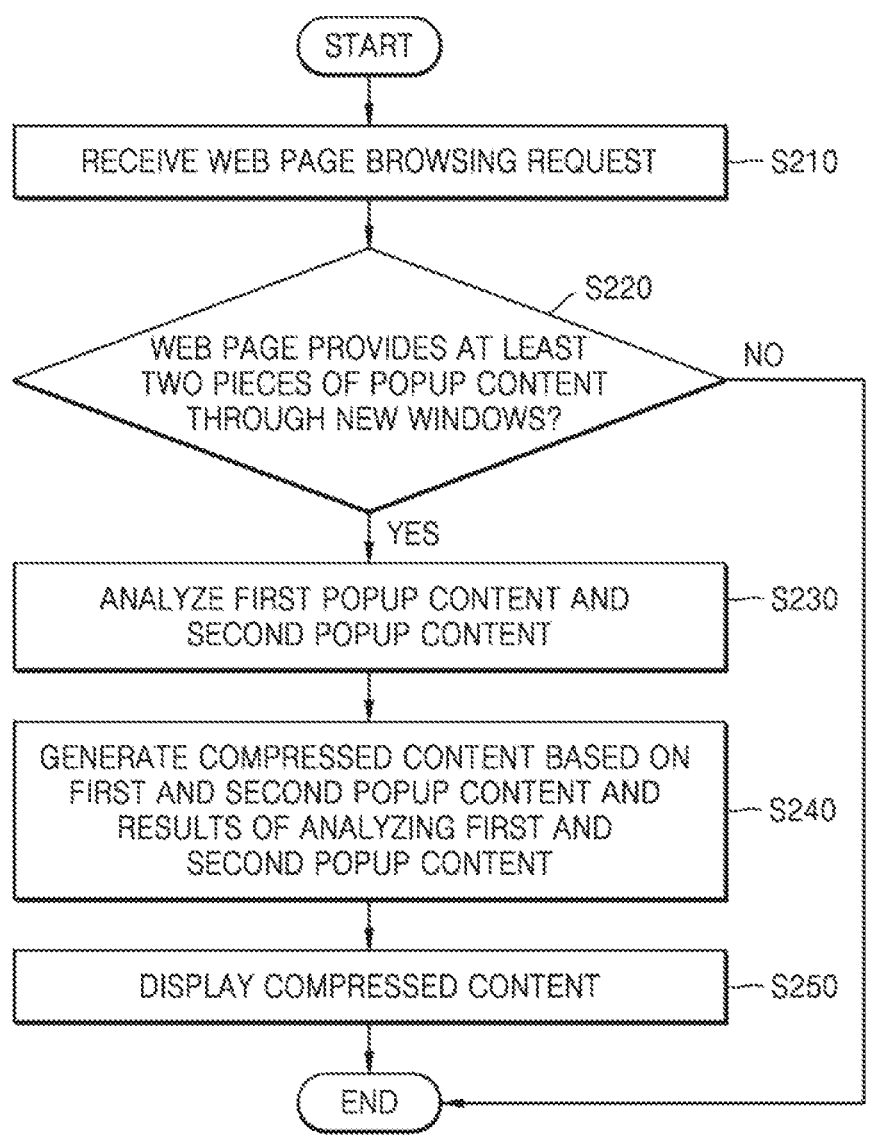

Referring to FIG. 4, the method according to an embodiment may include receiving of a web page browsing request (operation S210), determining whether a web page provides popup content (operation S220), analyzing the popup content (operation S230), generating compressed content (operation S240), and displaying the compressed content (operation S250). The method of FIG. 4 is related to generating and displaying one piece of compressed content by analyzing a plurality of pieces of popup content.

In operation S210, the user input interface 150 receives a web page browsing request from the user. The user input interface 150 receives an address of a web page to be browsed. The receiving module 131 receives, from a server, a code or instructions realized to generate the web page according to a request of the user.

In operation S220, the determining module 132 determines whether the web page provides first popup content and second popup content through new windows. The determining module 132 may determine whether the web page provides a plurality of pieces of popup content through new windows by analyzing the received code or instructions. When it is determined that the plurality of pieces of popup content are provided, the popup content analyzing module 133 may analyze each of the pieces of popup content, i.e., the first popup content and the second popup content, in operation S230. In operation S240, the content editing module 134 may generate one piece of compressed content in consideration of the first popup content, the second popup content, and the results of analyzing the first popup content and the second popup content. As such, the apparatus 100 according to an embodiment may provide a plurality of pieces of popup content provided in individual popup windows in one piece of compressed content. Here, the apparatus 100 according to an embodiment may generate one piece of compressed content or multiple pieces of compressed content distinguished according to web pages by using a plurality of pieces of popup content provided through a plurality of web pages. In operation S250, the display controlling module 135 may generate the compressed content.

Figure 5:
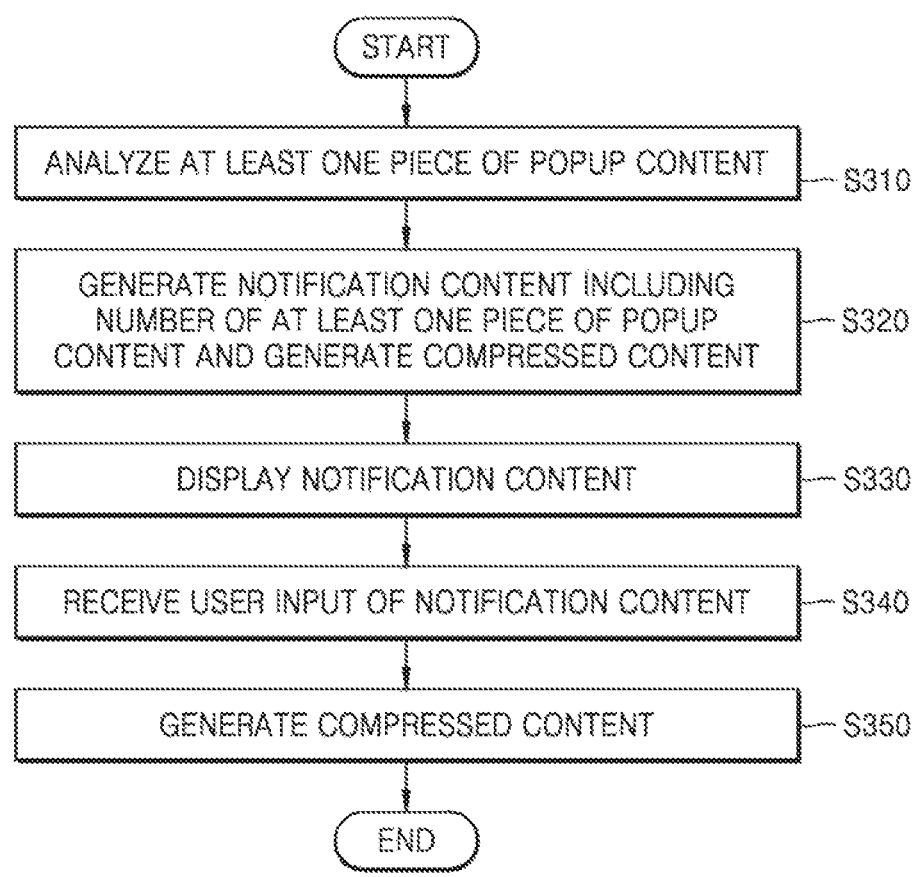

Referring to FIG. 5, the method according to an embodiment includes analyzing popup content (operation S310), generating content (operation S320), displaying the content (operation S330), receiving a user input (operation S340), and generating compressed content (operation S350).

In operation S310, the popup content analyzing module 133 analyzes at least one piece of popup content provided together with a web page.

In operation S320, the content editing module 134 generates notification content indicating the number of the at least one piece of popup content in consideration of the at least one piece of popup content and the result of analyzing the at least one piece of popup content, and may generate compressed content by summarizing or contracting the popup content.

In operation S330, the display controlling module 135 controls the notification content to be displayed. For example, when one piece of popup content is provided, the apparatus 100 may generate and display the notification content 'there is one popup', and when three pieces of popup content are provided, the apparatus 100 may generate and display the notification content 'there are three popups'. In operation S340, the user input interface 150 receives a user input in response to the notification content. In operation S350, the display controlling module 135 controls the compressed content to be displayed in response to the user input.

The apparatus 100 may display the notification content according to the setting of the user, and may display the popup content or display the compressed content by summarizing or contracting the popup content according to a user input on the notification content.

Figure 6:
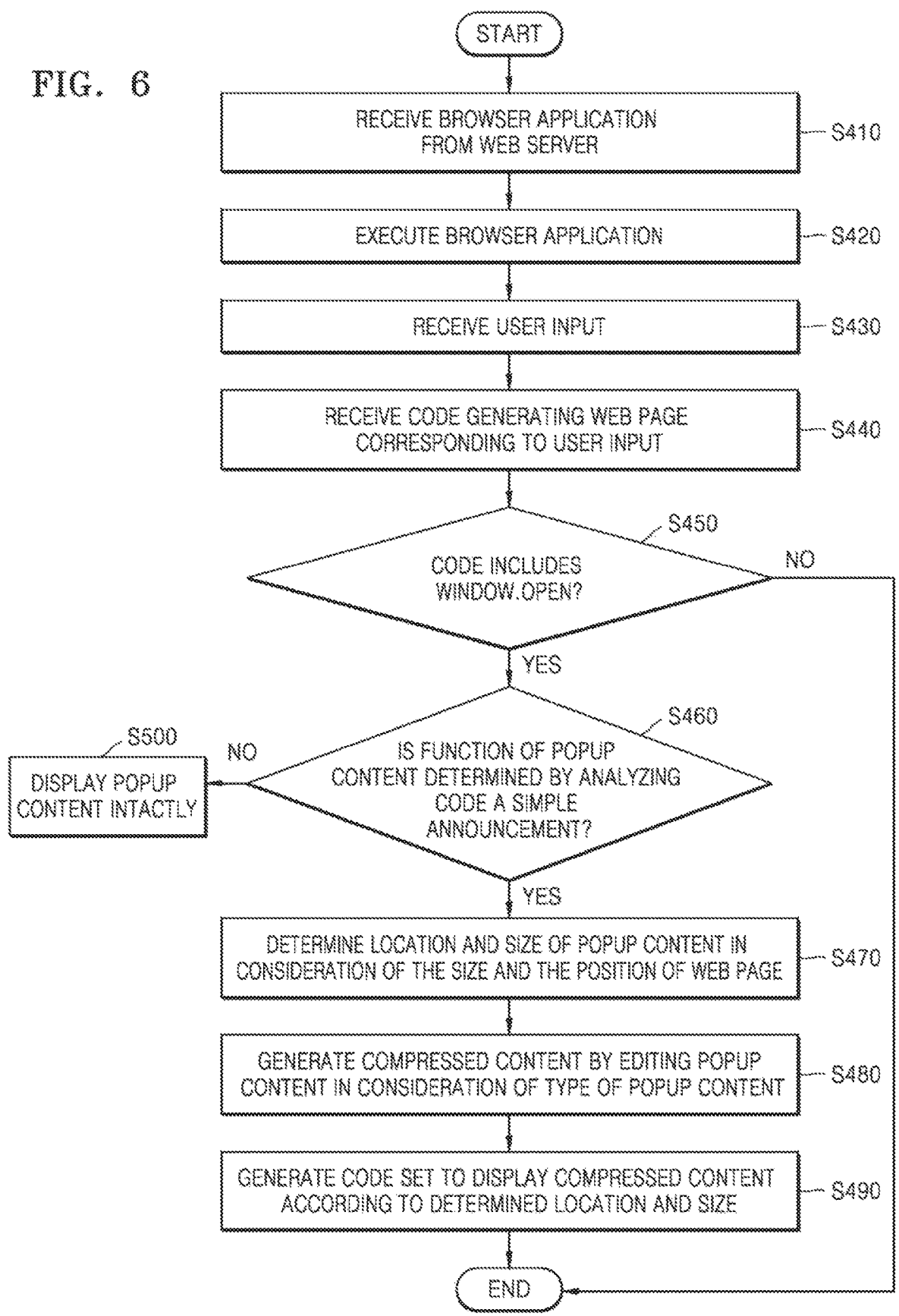

Referring to FIG. 6, the method according to an embodiment includes receiving a browser application from a server (operation S410), executing the browser application (operation S420), receiving a request from a user through the browser application (operation S430), receiving a code generating a web page corresponding to the request (operation S440), determining whether the web page includes popup content set to be distinguishably displayed by analyzing the code (operation S450), determining whether to edit the popup content by analyzing the code (operation S460), determining the location or the size of the popup content by considering at least one of a display area and a display window of the web page (operation S470), editing the popup content by considering the type of the popup content (operation S480), and generating a code set to display the popup content having the edited location or size (operation S490).

In operation S410, the apparatus 100 receives a browser application from a web server that performs a function of distributing browser applications. In operation S420, the apparatus 100 executes the browser application according to a user input. In operation S430, the apparatus 100 receives a user input through the user input interface 150. In operation S440, the apparatus 100 receives a code generating a web page corresponding to the user input. In operation S450, the apparatus 100 determines whether the code includes a function, such as "window.open". "Window.open" is a function defined in the Java script language, and performs a function of displaying a display window.

When it is determined that the code includes the function, the apparatus 100 determines the function of the popup content, and determines whether to edit the popup content in consideration of the function of the popup content in operation S460. When it is determined that the code includes the function, the apparatus 100 may determine whether the function of the popup content is a simple announcement by using the result of analyzing the popup content, in operation S460. When the function of the popup content is a simple announcement, the popup content is edited, and when the function of the popup content is not a simple announcement, the popup content is not edited but is displayed intactly through a separate window. Here, the popup content may be generated for at least one function from among advertising, information provision, and data input, and the function of the popup content may be determined in consideration of an attribute of a field included in the popup content. For example, when the popup content includes a text input field or a selection field, or when data is transferred to the web page displayed by the code, it may be determined that the function of the popup content is not a simple announcement, information provision, or advertising. In this case, the popup content is not edited but is displayed intactly, in operation S500.

When it is determined that the function of the popup content is a simple announcement, information provision, or advertising, the apparatus 100 determines that the popup content needs to be edited and determines the location and the size of the popup content in consideration of the size of the web page on the display area, in operation S470. The apparatus 100 determines the location and the size of the popup content such that the popup content is suitably displayed by using an empty space on the window without covering the content of the web page. The apparatus 100 may determine the location and the size of the popup content such that the popup content is displayed outside the area of the web page, or such that the popup content is displayed without overlapping the content in the web page. Accordingly, the method according to an embodiment does not unconditionally edit the popup content, and may edit the popup content only when an operation, progress, and/or process of the web page is not restricted.

In operation S480, the apparatus 100 may generate compressed content by editing the popup content such that the popup content is suitably displayed according to the location and the size. Here, the apparatus 100 edits the popup content in consideration of the type of the popup content. For example, when the popup content is text, the number of letters, a type of font, and a size of font may be adjusted such that the compressed content is within the size. Also, when the popup content is an image, a background image, a background color, and an object image included in the image are extracted, and the compressed content is generated by adjusting the size and the location of the object image while excluding or leaving only some of the background color and the background image, because importance of the background color and the background image is relatively low compared to the object image. Also, when the popup content is a video, several frames included in the video are not displayed, but the first or last frame is selected as a representative image and the popup content is edited such that only the representative image is displayed.

In operation S490, the apparatus 100 generates a code set to display the compressed content according to the size and location of the popup content. Here, the code may be generated in any one of various programming languages, such as Java script and HTML.

Figure 7:
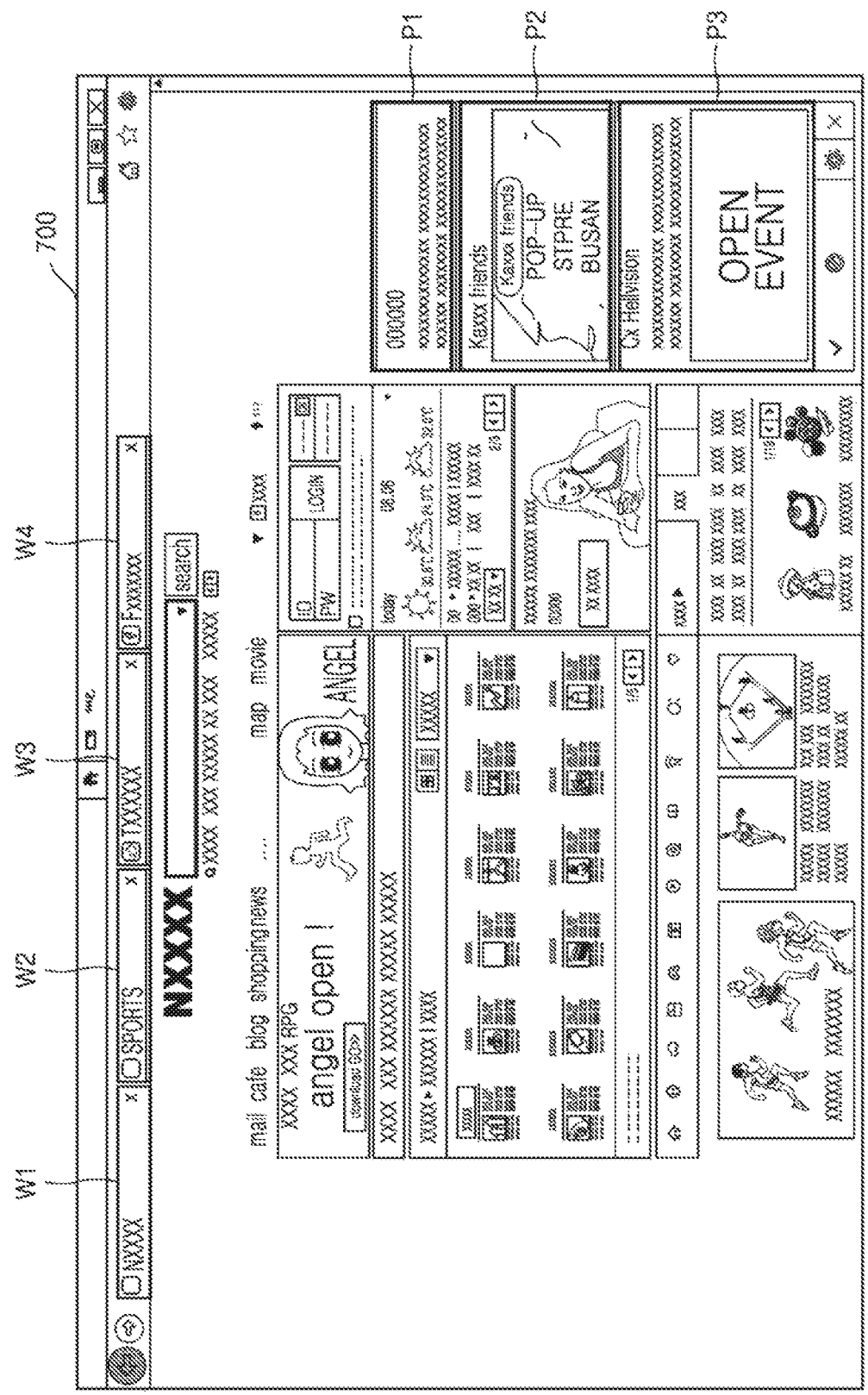
FIGS. 7 and 8 illustrate examples of user interfaces generated by an apparatus for compactedly displaying popup content, according to embodiments.
Figure 8:
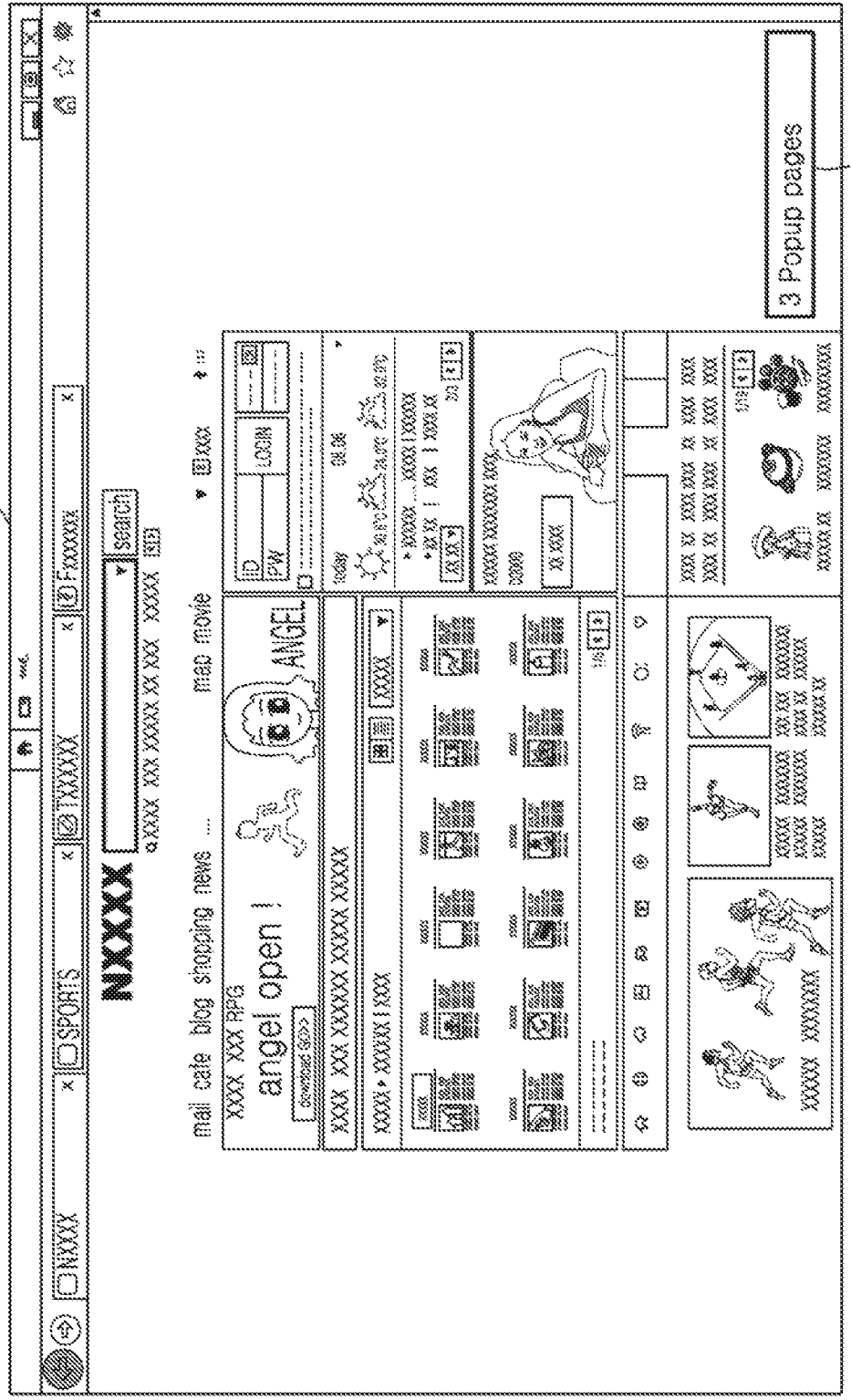

FIGS. 7 and 8 illustrate examples of user interfaces generated by the apparatus 100 for compactedly displaying popup content, according to embodiments.

As shown in FIG. 7, a user interface generated by the apparatus 100 according to an embodiment may include a display area 700 for displaying a web page. The display area 700 may include an address bar, in which an address is input and address information of a displayed page is displayed, a close button, a deactivation button for deactivating the display area 700, and a full screen button for changing the display area to a full screen.

The apparatus 100 according to an embodiment may control a plurality of web pages W1 through W4 to be displayed. The apparatus 100 according to an embodiment may display the web pages W1 through W4 on all or some of the display area 700. The apparatus 100 may display the web pages W1 through W4 such that they overlap each other or not overlap each other. The apparatus 100 may further display popup content while displaying the web pages W1 through W4. The popup content may be edited to be displayed in an area that does not overlap content of the web pages W1 through W4. As shown in FIG. 7, the apparatus 100 according to an embodiment may control the popup content to be displayed with the web pages W1 through W4, in an area that does not overlap the content of the web pages W1 through W4. When a size of the popup content is too big and thus the popup content is difficult to be displayed on a part of the web pages W1 through W4, the apparatus 100 may analyze the popup content and generate and display compressed content P1 through P3 by summarizing or contracting the popup content.

As shown in FIG. 8, the apparatus 100 according to an embodiment may provide a user interface 800 providing notification content P4. The apparatus 100 according to an embodiment may provide the notification content P4 including the number of pieces of popup content included in compressed content instead of displaying the compressed content as shown in FIG. 7.

FIGS. 9A, 9B, 10A, 10B, 11A and 11B illustrate examples of user interfaces generated by the apparatus 100, according to other embodiments.

Figure 9A:
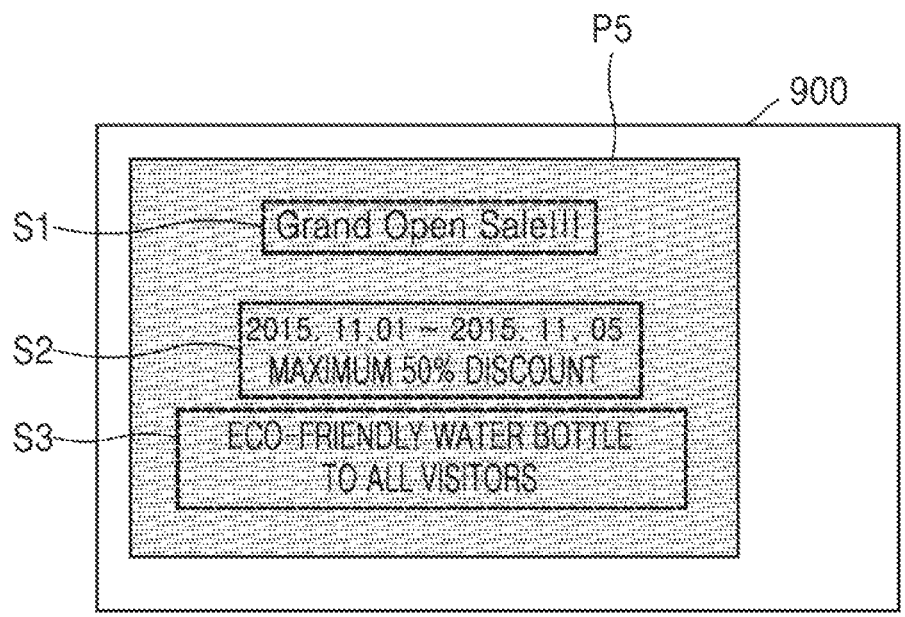
FIGS. 9A, 9B, 10A, 10B, 11A and 11B illustrate examples of user interfaces generated by an apparatus for compactedly displaying popup content, according to other embodiments.
Figure 9B:
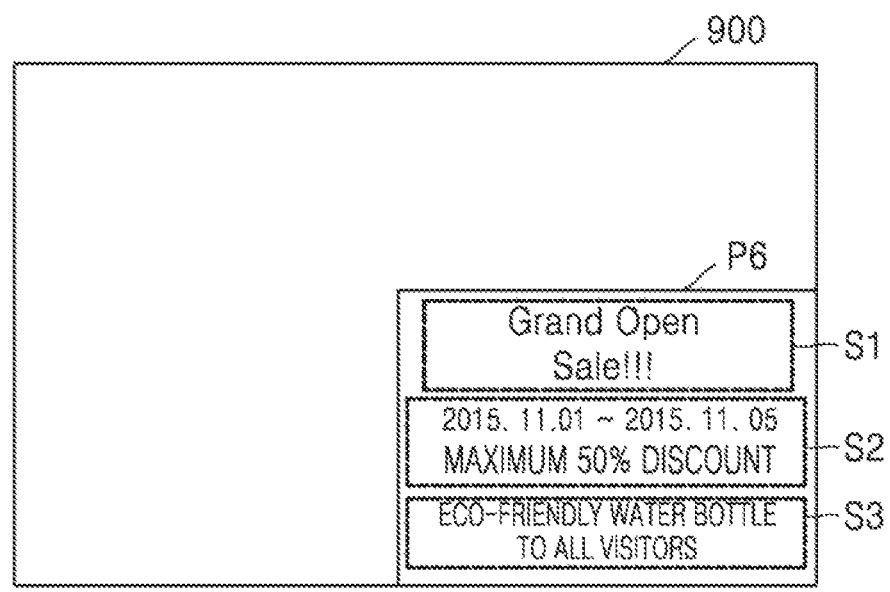

In FIGS. 9A and 9B, the apparatus 100 according to an embodiment may analyze popup content P5 provided together with a web page 900, and generate compressed content P6 in consideration of the popup content P5 and a result of analyzing the popup content P5. The apparatus 100 according to an embodiment may, for example, extract text images S1 through S3 that are object images included in the popup content P5, and generate the compressed content P6 by reducing the size of the text image S1, edit the text image S1, and reducing the text images S2 and S3 to different sizes.

Figure 10A:
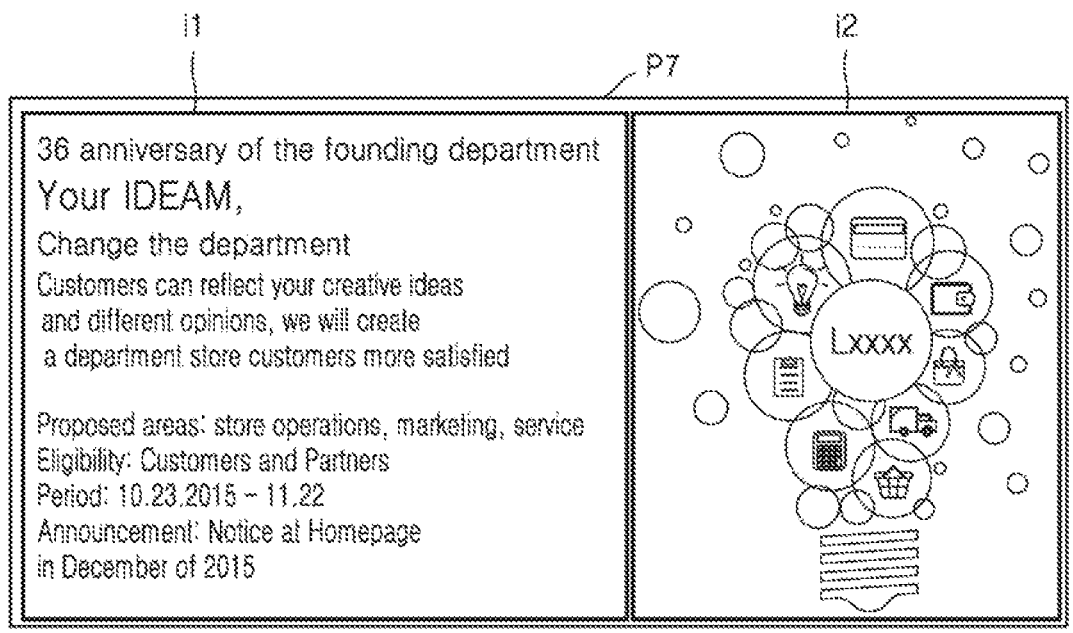
Figure 10B:
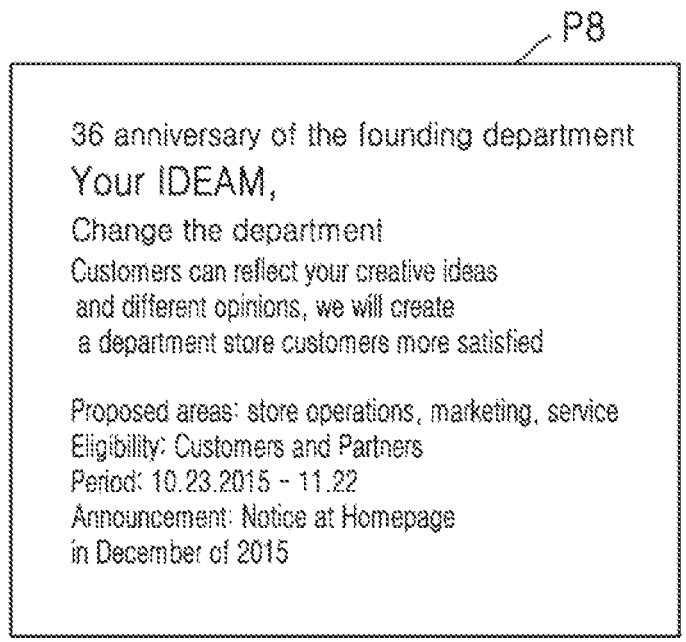

As shown in FIGS. 10A and 10B, when a popup window P7 includes a plurality of images i1 and i2, a popup window P8 edited by the apparatus 100 according to an embodiment may include compressed content displaying only the image i1 from among the images i1 and i2. The apparatus 100 according to an embodiment may select the image i1 as a representative image in consideration of locations, sizes, and objects of the images i1 and i2 included in the popup window P7. For example, the apparatus 100 according to an embodiment may select the image i1 that is displayed leftmost as a representative image, the image i1 that has a largest size as a representative image, or the image i1 including more text than the image i2 as a representative image. The apparatus 100 according to an embodiment selects the image i1 as a representative image, and generates the compressed content P8 such that only the image i1 is displayed.

Figure 11A:
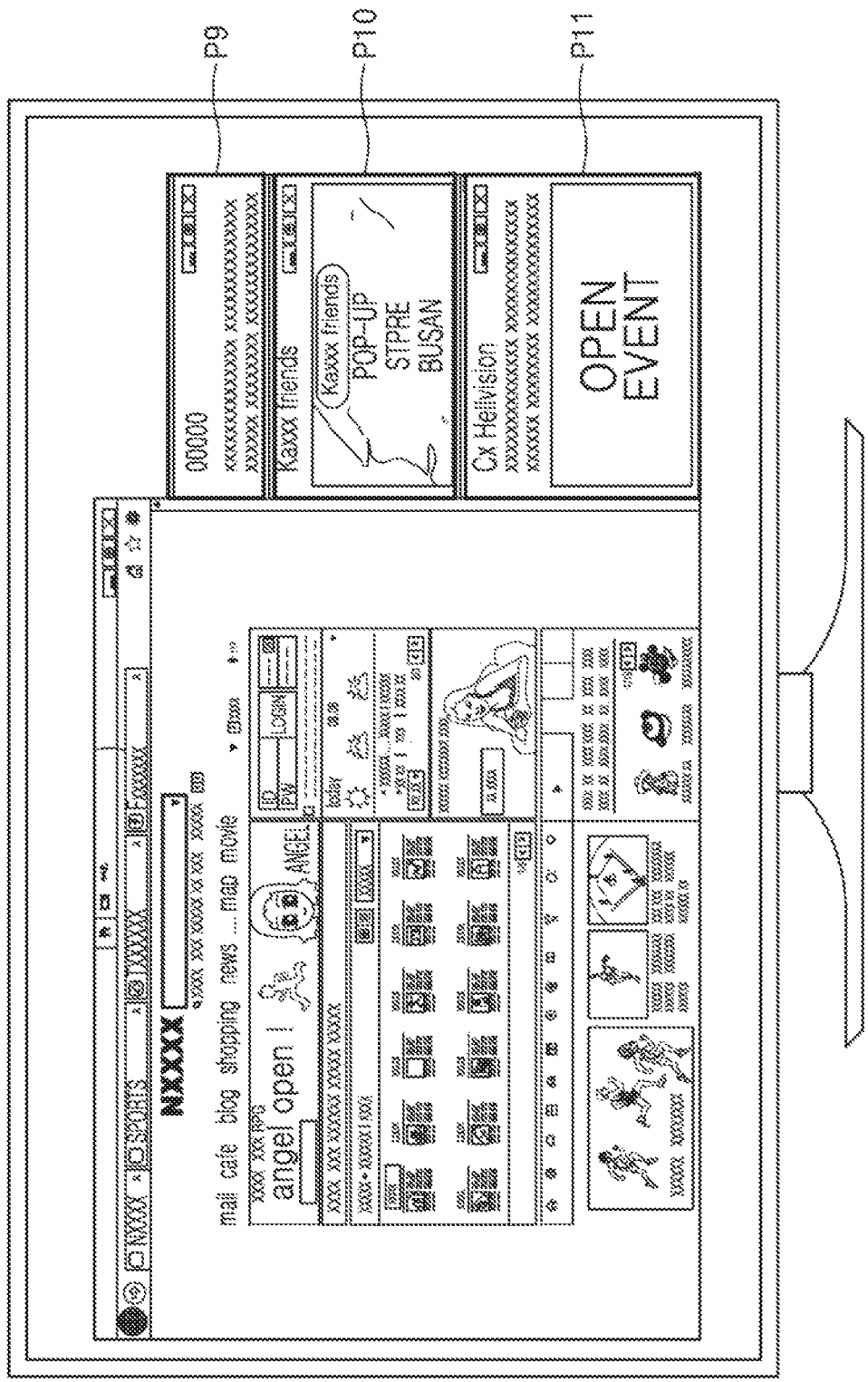
Figure 11B:
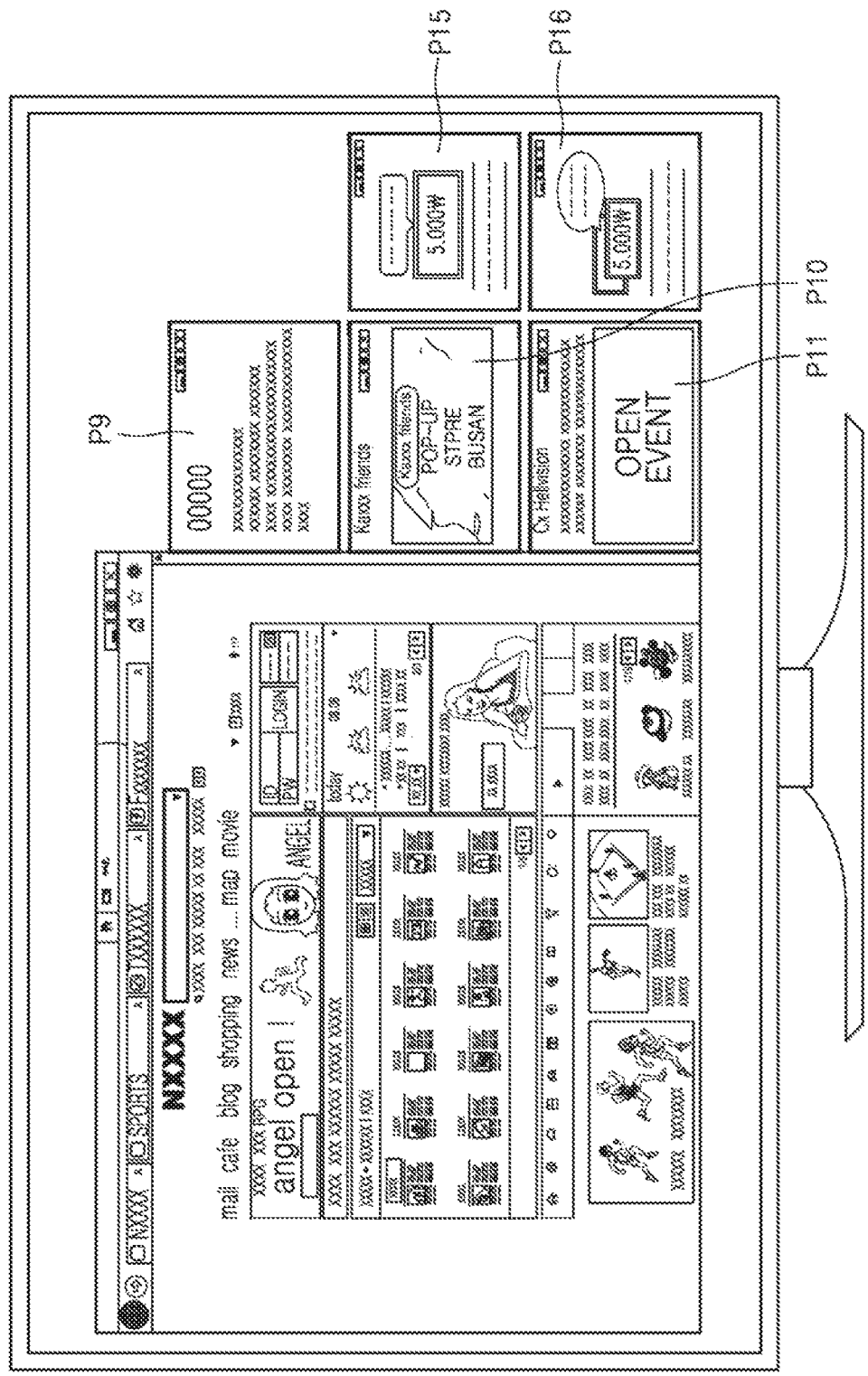

As shown in FIG. 11A, the apparatus 100 according to an embodiment may generate and display one piece of compressed content by using pieces of popup content related to a plurality of web pages, while generating the plurality of web pages. When compressed content including three pieces of popup content P9, P10, P11 is provided as shown in FIG. 11A, and then two more pieces of popup content P15, P16 are to be further provided as shown in FIG. 11B, the apparatus 100 according to an embodiment may generate compressed content by adding the compressed content that is already displayed and popup content to be additionally displayed. At this time, in order to display the compressed content in the same area, the apparatus 100 according to an embodiment may change an arrangement, location, and size of the popup content. When the number of pieces of popup content increases, the apparatus 100 may, for example, increase the arrangement of the popup content from 1 row to 2 rows or from 1 column to 2 columns.

Also, the apparatus 100 may control the compressed content to be no longer displayed when the display time of the compressed content has passed a pre-set threshold time. Also, the apparatus 100 may generate the compressed content such that when an input for closing a web page related to the compressed content is received, popup content provided in relation to the web page included in the compressed content is removed, even if a user input for closing the compressed content is not received.

With respect to providing of popup content together with a web page, the popup content set to be displayed as a separate popup window may be edited to be displayed on the same window as the web page.

Compressed content may be generated by summarizing or contracting popup content by considering the popup content.

Popup content may be controlled to be intactly displayed by considering a function of the popup content. One or more of the above embodiments may be embodied in the form of a computer program that can be run in a computer through various elements. The computer program may be recorded on a non-transitory computer-readable recording medium. Examples of the non-transitory computer-readable recording medium include magnetic media (e.g., hard disks, floppy disks, and magnetic tapes), optical media (e.g., CD-ROMs and DVDs), magneto-optical media (e.g., floptical disks), and hardware devices specifically configured to store and execute program commands (e.g., ROMs, RAMs, and flash memories). Furthermore, the non-transitory computer-readable recording medium may be a formless medium that can be transmitted and distributed in a network, e.g., software or an application.

Examples of the computer commands include mechanical codes prepared by a compiler, and high-level languages executable by a computer by using an interpreter.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a", "an", and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. An apparatus for compactedly displaying popup content, the apparatus comprising:
a processor configured to execute a plurality of computer program modules; and
a non-transitory computer-readable recording medium configured to store the plurality of computer program modules executed on the processor, wherein the plurality of computer program modules comprises:
a determining module configured to determine that a browsed web page to be displayed on a displayer provides first popup content through a first window having a first size to he displayed on the displayer;
a popup content analyzing module configured to analyze the first popup content displayed through the first window;
a content editing module configured to edit the first popup content to reduce an amount of content of the first popup content to generate compressed content having the reduced amount of content based on a result of analyzing the first popup content and determining a location of the first popup content; and
a display controlling module configured to display the compressed content through a second window having a second size smaller than the first size of the first window on the displayer,
wherein the compressed content is positioned on the displayer so as not to overlap a content of the web page,
wherein, when it is determined that the first popup content comprises an image based on the result of analyzing the first popup content by the popup content analyzing module, the content editing module extracts an object image included in the image and generates the compressed content by adjusting a size of the object image, and
wherein, when the browsed web page provides second popup content through a third window separate from the first window where the first popup content is provided, the popup content analyzing module further analyzes the second popup content, and the content editing module generates the compressed content based on results of analyzing the first popup content and the second popup content.

2. The apparatus of claim 1, wherein, when it is determined that the first popup content comprises text based on the result of analyzing the first popup content by the popup content analyzing module, the content editing module generates the compressed content by contracting the text to a pre-set threshold number of letters or lower than the pre-set threshold number of letters.

3. The apparatus of claim 1, wherein, when it is determined that the first popup content comprises a video based on the result of analyzing the first popup content by tie popup content analyzing module, the content editing module extracts a certain frame of the video as a representative image and generates the compressed content by using only the representative image.

4. The apparatus of claim 1, wherein the content editing module generates first compressed content based on the result of analyzing the first popup content, and generates second compressed content based on the result of analyzing the second popup content, and
the display controlling module controls the first compressed content and the second compressed content to be displayed on separate parts of the browsed web page.

5. The apparatus of claim 4, wherein when an input of selecting the first compressed content is received, the display controlling module stops displaying of the first compressed content.

6. The apparatus of claim 4, wherein the first compressed content comprises link information of the first popup content, the second compressed content comprises link information of the second popup content, and when an input of selecting the first compressed content is received, the display controlling module displays a web page corresponding to the link information comprised in the first compressed content through a new window.

7. The apparatus of claim 1, wherein the display controlling module controls the compressed content to be displayed outside an area set to display the browsed web page.

8. The apparatus of claim 1, wherein the popup content analyzing module analyzes whether the first popup content comprises an input field when the browsed web page provides the first popup content through the first window, and
the display controlling module controls the first popup content to be intactly displayed when it is determined that the first popup content comprises the input field.

9. The apparatus of claim 1, wherein the content editing module generates notification content indicating a number of pieces of popup content provided through the browsed web page, and
the display controlling module. controls to display the compressed content on a part of the browsed web page when receiving a predetermined user input corresponding to the notification content while the notification content is displayed.

10. A method of compactedly displaying popup content using a processor, the method comprising:
determining that a browsed web page to be displayed on a displayer provides first popup content through a first window having a first size to be displayed on the displayer; analyzing the first popup content displayed through the first window;
editing the first popup content to reduce an amount of content of the first popup content to generate compressed content having the reduced amount of content based on a result of analyzing the first popup content and determining a location of the first popup content;
displaying the compressed content through a second window having a second size smaller than the first size of the first window on the displayer,
wherein the compressed content is positioned on the displayer so as not to overlap a content of the web page,
wherein, when it is determined that the first popup content comprises an image based on the result of analyzing the first popup content by the popup content analyzing module, the content editing module extracts an object image included in the image and generates the compressed content by adjusting a size of the object image, and wherein, when the browsed web page provides second popup content through a third window separate from the first window where the first popup content is provided, the popup content analyzing module further analyzes the second popup content, and the content editing module generates the compressed content based on results of analyzing the first popup content and the second popup content.

11. The method of claim 10, wherein when the first popup content comprises text based on the result of analyzing the first popup content, generating the compressed content by contracting the text to a pre-set threshold number of letters or lower than the pre-set threshold number of letters.

12. The method of claim 10, wherein when the first popup content comprises a video based on the result of analyzing the first popup content, extracting a first frame of the video as a representative image and generating the compressed content by using only the representative image.

13. The method of claim 10, further comprising:
determining whether the first popup content comprises an input field, and
when the first popup content comprises the input field, intactly displaying the first popup contact instead of the compressed content.

14. The method of claim 10, further comprises:
generating notification content indicating a number of pieces of popup content provided together with the browsed web page, and
displaying the compressed content on a part of the browsed web page when receiving a predetermined user input corresponding to the notification content while the notification content is displayed.

15. A non-transitory computer-readable recording medium having recorded thereon a program for compactedly displaying popup content, the program when executed by a computer, causing the computer to perform the method comprising:
determining that a browsed web page to be displayed on a displayer provides first popup content through a. first window having a first size to be displayed on the displayer; analyzing the first popup content displayed through the first window;
editing the first popup content to reduce an amount of content of the first popup content to generate compressed content having the reduced amount of content based on a result of analyzing the first popup content and determining a location of the first popup content;
displaying the compressed content through a second window having a second size smaller than the first size of the first window on the displayer,
wherein the compressed content is positioned on the displayer so as not to overlap a content of the web page,
wherein, when it is determined that the first popup content comprises an image based on the result of analyzing the first popup content by the popup content analyzing module, the content editing module extracts an object image included in the image and generates the compressed content by adjusting a size of the object image, and
wherein, when the browsed web page provides second popup content through a third window separate from the first window where the first popup content is provided, the popup content analyzing module further analyzes the second popup content, and the content editing module generates the compressed content based on results of analyzing the first popup content and the second popup content.

* * * * *